UNITED STATES PATENT OFFICE.

D. R. AVERILL, OF NEW CENTREVILLE, FOR HIMSELF, AND THE AVERILL CHEMICAL PAINT COMPANY, OF NEW YORK, N. Y., ASSIGNEES OF D. R. AVERILL.

IMPROVEMENT IN PAINT.

Specification forming part of Letters Patent No. 66,773, dated July 16, 1867; reissue No. 3,051, dated July 28, 1868; reissue No. 3,599, dated August 17, 1869.

DIVISION C.

*To all whom it may concern:*

Be it known that D. R. AVERILL, formerly of Newburg, Cuyahoga county, Ohio, now of New Centreville, Oswego county, New York, did invent an Improvement in Paint; and we, D. R. AVERILL and THE AVERILL CHEMICAL PAINT COMPANY, of the city, county, and State of New York, do hereby declare that the following is a full and complete description of one sample of the same—viz., of the ingredients and of the manner of compounding them.

The object of this invention is to provide a paint which may be supplied to the trade and to consumers in a prepared liquid or mixed condition, and in suitable and convenient packages ready for use, and in any color or shade. In the use of the paints as now prepared great trouble and vexatious delays are encountered in mixing, coloring, and otherwise preparing them for use, as they must be mixed at the time of using them, and used within a short time of mixing, and if there be any residue the mineral part very soon separates from the oil, and settles at the bottom in a hard or semi-solid mass, unfit for use without regrinding or remixing. To prepare it, in the first place, requires the procuring of the several ingredients, such as white lead, oil, turpentine, and the drier, all in separate packages and in various quantities, which must be carefully and skillfully mixed in such quantities only as may be readily used up. If a colored paint is required many other separate packages of coloring-matter must be used, which, if dry, must also be ground, and to procure the shade desired great skill in the application of the coloring-matter is necessary; and not only with respect to the proper application of the coloring-matter is skill required, but also to prepare the paint so that when it is applied it will be of such temper or consistency as to spread well and yet retain sufficient body to cover the surface and not run.

Now, to obviate these difficulties, it is proposed to provide a liquid paint ready mixed and fully prepared at the time of manufacturing it, so that when the packages are opened it will be ready for immediate use, and which will remain in such condition for any indefinite length of time, whether exposed to the atmosphere or not when not applied.

It will be readily perceived that a paint so prepared and mixed when being manufactured, where every facility for accomplishing the same with accuracy and uniformity may be had, may be furnished to the consumer of every color and quality, with the nicest graduations, and at less cost and delay than the present paints of commerce.

To this end one example is provided—viz., the following preparation: First, take two hundred pounds of the oxide of zinc in a dry state, and grind it in twenty gallons of linseed-oil, to which add a compound prepared as follows, viz.: Mix five pounds of the acetate of lead with ten pounds of the sulphate of zinc in a sufficient amount of water to give a specific gravity of 3° Baumé when the salts are dissolved. Then take a sufficient quantity of the soluble silicate of soda dissolved in water to make three gallons, having a specific gravity of 8° Baumé; also, prepare six gallons of a saturated solution of lime in water. Now take three gallons of the mixture of the acetate-of-lead and zinc solution with three gallons of the solution of the silicate of soda, and add six gallons of the lime water or solution and six gallons of linseed-oil. These are all combined and then compounded with the aforementioned two hundred pounds of ground zinc and oil, after which are added six gallons of benzine, and the whole compound is then thoroughly ground together, producing a white, glossy, cheap, and durable paint, which may receive any color or tint desired by adding coloring-matter to it.

White lead or coloring pigment may be used in place of the aforementioned zinc. When positive colors are desired, other pigments may be used, such as red, blue, &c. The light colors or tints may also be obtained by mixing pigments in proper proportions with the compound when first prepared.

Various other modifications of the above compound may be used to advantage; for instance, as a substitute for the silicate of soda, silicate of potash, or any other soluble silicate may be used, or carbonate of lime, or chloride of calcium, for the lime; also any other suitable oil may be used instead of linseed, with or without glutinous matter. Turpentine may be used instead of benzine, and other equivalents of the aforesaid ingredients may be employed.

What is claimed as the improvement of said AVERILL, and desired to be secured by Letters Patent, is—

A new article of manufacture—a liquid oleaginous paint, prepared ready for use, and which will retain its fluid condition when not applied.

D. R. AVERILL.
AVERILL CHEMICAL PAINT CO.,
By S. M. CADY, *Vice President.*

Witnesses:
W. H. BURRIDGE,
E. E. WAITE.